No. 633,702. Patented Sept. 26, 1899.
C. F. RODDE.
ELECTRICAL MEASURING AND INDICATING APPARATUS.
(Application filed May 11, 1899.)
(No Model.)
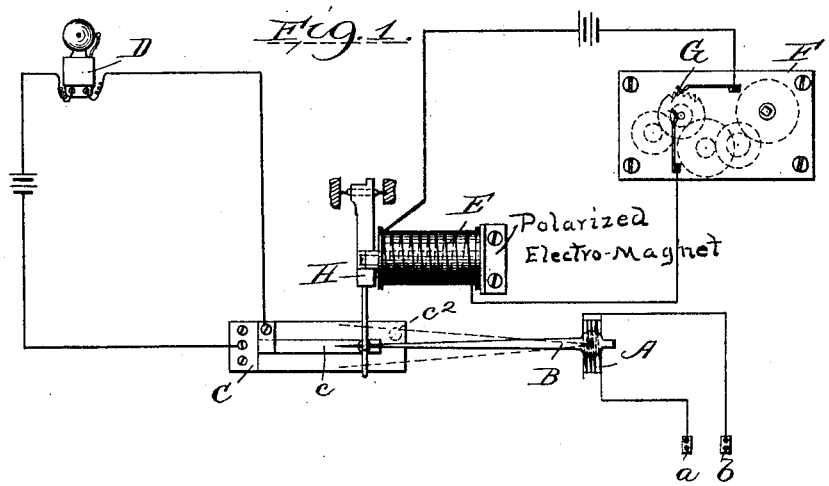
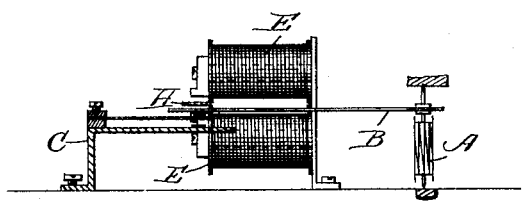
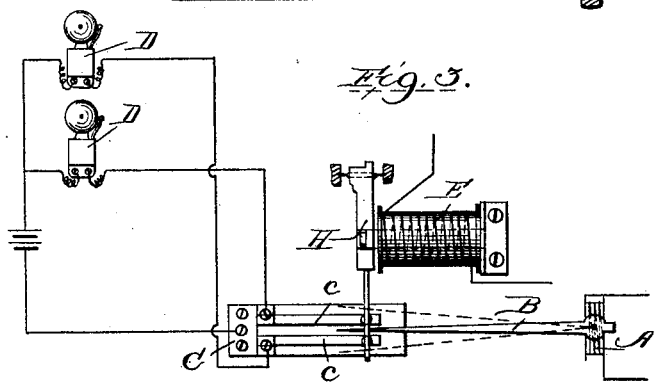
Witnesses:
R. White.
Inventor:
Carl Friedrich Rodde.
By Charles A. Brown & Cragg.
Attorneys.
THE NORRIS PETERS CO., PHOTO-LITHO., WASHINGTON, D. C.

UNITED STATES PATENT OFFICE.

CARL FRIEDRICH RODDE, OF GROSS LICHTERFELDE, GERMANY, ASSIGNOR TO THE SIEMENS & HALSKE ELECTRIC COMPANY OF AMERICA, OF CHICAGO, ILLINOIS.

ELECTRICAL MEASURING AND INDICATING APPARATUS.

SPECIFICATION forming part of Letters Patent No. 633,702, dated September 26, 1899.

Application filed May 11, 1899. Serial No. 716,375. (No model.)

*To all whom it may concern:*

Be it known that I, CARL FRIEDRICH RODDE, a subject of the German Emperor, residing at Gross Lichterfelde, near Berlin, Germany, have invented a certain new and useful Improvement in Electrical Measuring and Indicating Apparatus, (Case No. 196,) of which the following is a full, clear, concise, and exact description, reference being had to the accompanying drawings, forming a part of this specification.

My invention relates to improvements in electrical measuring and indicating apparatus, and has for its object the provision of means for securing the closure of a secondary circuit under or during the existence of predetermined conditions in the measured circuit.

My invention may be more particularly described as relating to a circuit-closing device which is associated with a secondary circuit containing either suitable indicating or regulating apparatus, as the conditions of the system may require. The circuit-closing device is operated through the medium of a needle or part mounted upon a measuring instrument connected with the observed circuit and an intermittently-actuated arm adapted when the needle is in a predetermined position or positions to actuate the circuit-closing device in the secondary circuit.

My invention will be more readily understood by reference to the accompanying drawings, illustrating the same, wherein—

Figure 1 is a diagrammatic view of a system of electrical apparatus embodying my invention. Fig. 2 is a view, partly in section, illustrating coacting means, consisting of a polarized relay for effecting the closure of the secondary circuit; and Fig. 3 illustrates somewhat diagrammatically a modification of the circuit-closing device.

The same letter of reference is used to designate like parts in each figure of the drawings.

The measured circuit is connected to binding-posts $a\ b$ of an electrical measuring instrument A. Upon the rotatably-mounted armature of the said instrument is secured the long needle or arm B, which is adapted freely to swing upon the pivot of the instrument A under the influence of the current flowing in the measured circuit. A circuit-controlling device C is connected in the secondary circuit, provided with a battery and an audible signal D. The circuit-controlling device C is provided with a thin spring-arm $c$, carrying at its extended end a platinum contact, which is adapted to engage with a coacting contact upon the base of the device when the spring is slightly depressed, thus closing the secondary circuit and actuating the signal D. I have illustrated electromagnetic means for effecting the closure of this secondary circuit, consisting of a polarized electromagnet E, energized by its separate battery, and a train of clockwork F, actuating an interrupter G, which controls the flow of current in the connected circuit. A pivoted lever H is adapted to be actuated by the said electromagnet, between the extended end of which lever and the extremity of spring $c$ the arm or needle B is adapted freely to swing. It is obvious that a mechanically-actuated arm could be substituted for the electromagnetically-actuated lever H.

The operation of the system above described will now be understood. The needle B, under the influence of the current flowing in the observed circuit, will assume varying positions according to the intensity of the current flowing therein. When it reaches a median position, however, immediately over the spring $c$, the extended end of the lever H, which is intermittently actuated under the influence of the current flowing in the interrupted circuit, will depress the extremity of the needle B, which, coming in contact with the end of the spring $c$, will close the secondary or signaling circuit and actuate the bell D. It will be understood that when the needle is in any other position, however, the movement of the lever H will be insufficient to depress the spring $c$, and during such times the circuit-closing device will not be operated. It is apparent that other apparatus, such as a visual signal or regulating appliances, may be substituted for the bell D, if desired. Should a signal be required for all current intensities above or below a predetermined value, a stop $c^2$ may be disposed upon the base of the device C in position to be engaged by the needle, by which it will be held in its position over the spring $c$, thus insuring the continuous closure of the secondary circuit while the predetermined conditions in the observed circuit prevail.

The arrangement illustrated in Fig. 3 is designed to secure a separate or independent signal for varying conditions of circuit, which is obtained by duplicating the contact apparatus C, a plurality of contact-making springs $c$ serving to actuate separate circuits in the manner above described and indicate the variations of the needle B.

The apparatus of my invention varies from that previously employed for similar purposes in that the needle of the measuring-instrument A does not serve as a contact part when reaching a predetermined position, but instead serves as intermediate means for actuating a separate circuit-controlling device connected in the secondary circuit.

I do not desire to be understood as limiting myself to the precise form of apparatus herein shown and described; but, Having explained my invention, what I do claim, and desire to secure by Letters Patent, is—

1. In apparatus of the class described, the combination with an electrical measuring instrument, of a circuit-controlling device associated therewith connected with a secondary circuit, a movable needle or part of the measuring instrument adapted to swing into and out of position for engagement with the circuit-controlling device, and an actuated lever or part adopted to move the needle when the same is in a predetermined position, whereby the circuit-controlling device is governed and the secondary circuit is in turn controlled, substantially as described.

2. In apparatus of the class described, the combination with a measuring instrument connected with the observed circuit, of a contact appliance associated therewith, the needle of the measuring instrument being adapted to swing above the contact appliance, a secondary circuit connected with the contact appliance containing a source of electrical energy and apparatus adapted to be actuated thereby, and an intermittently-actuated lever or part adapted through the medium of the needle to actuate the contact appliance when the said needle has reached a predetermined position, whereby the secondary circuit is closed, substantially as described.

3. In apparatus of the class described, the combination with a measuring instrument A connected with the observed circuit, of a contact device C connected with and controlling a secondary circuit containing electrically-operated apparatus, and an electromagnet E connected in circuit with an interrupting device, the lever of said magnet being adapted to engage the needle B of the measuring instrument when in a predetermined position and depress the same to effect the closure of the secondary circuit through the device C, substantially as described.

4. In apparatus of the class described, the combination with an instrument A having a movable needle or arm B responsive to variations in the current tension of the observed circuit, of a contact-making device C, controlling a secondary circuit, electrical indicating apparatus D included in said circuit, an electromagnet E connected in an interrupted circuit, and an arm or lever H of said electromagnet adapted to engage the extended end of the needle B actuated by the measuring instrument and close the secondary circuit when said needle has reached a predetermined position, substantially as described.

In witness whereof I hereunto subscribe my name this 24th day of April, A. D. 1899.

CARL FRIEDRICH RODDE.

Witnesses:
HENRY HASPER,
WALDEMAR HAUPT.